(12) United States Patent
Inglis et al.

(10) Patent No.: US 6,265,006 B1
(45) Date of Patent: *Jul. 24, 2001

(54) METHOD AND APPARATUS FOR APPLYING VOLATILE SUBSTANCES TO MATERIALS

(75) Inventors: Andrew Stirling Inglis, Wybong; David James Lark, Woodburn, both of (AU)

(73) Assignee: Vaporex PTY LTD, New South Wales (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,616

(22) Filed: Jun. 19, 1998

(30) Foreign Application Priority Data

Aug. 22, 1997 (AU) .................................................. PO 8738

(51) Int. Cl.[7] ........................................................ A23L 3/00
(52) U.S. Cl. .......................... 426/320; 426/312; 426/654; 99/467
(58) Field of Search .................................. 426/320, 262, 426/312, 335, 532, 654; 99/467, 473

(56) References Cited

U.S. PATENT DOCUMENTS

| | | | | |
|---|---|---|---|---|
| 1,703,782 | * | 2/1929 | Schmidt | 426/320 |
| 2,131,134 | * | 9/1938 | Baer et al. | 426/320 |
| 2,150,827 | * | 3/1939 | Ginaca | 426/320 |
| 2,665,217 | | 1/1954 | Meuli | 99/154 |
| 3,506,458 | * | 4/1970 | Martin | 426/320 |
| 4,834,997 | * | 5/1989 | Howard | 426/320 |
| 5,445,792 | | 8/1995 | Rickloff et al. | 422/28 |

FOREIGN PATENT DOCUMENTS

| | | | |
|---|---|---|---|
| 33362/89 | 11/1989 | (AU) | A61L/2/20 |
| 65769/90 | 5/1991 | (AU) | A61L/2/20 |
| 2002247 | 7/1988 | (ES) | A23L/3/34 |
| 245671 | * 1/1926 | (GB) . | |
| 1169550 | 11/1969 | (GB) | A23L/3/00 |
| 06099051 | 4/1994 | (JP) | B01J/3/02 |
| 94/11035 | 5/1994 | (WO) | A61L/2/20 |

OTHER PUBLICATIONS

Potter, N., Food Science, Third Edition, 1978, AVI Publishing Company, Inc. Westport, CT, pp. 149–156.*

Lueck, E., Antimicrobial food additives. Characteristics, uses, effects. ISBN: 3–540–10056–3, 81(02):T0053, FSTA, 1980.*

Dictionary of Chemistry and Chemical Technology in Six Languages, 1966, 165–166.

* cited by examiner

Primary Examiner—Leslie Wong
(74) Attorney, Agent, or Firm—McDermott, Will & Emery

(57) ABSTRACT

This invention relates to a method and apparatus for applying volatile substances, particularly microbicidal substances, to materials such as foods, pharmaceutical products and ingredients thereof for the purpose of achieving at least partial microbial decontamination and/or shelf-life extension. The volatile substance, which is preferably carbonic acid, acetic acid, hydrogen peroxide and mixtures thereof, are entrained in a carrier gas and preferably applied to the material at an over-pressure of up to 3 bar (2250 mm Hg) above atmospheric pressure.

29 Claims, 3 Drawing Sheets

METHOD AND APPARATUS FOR APPLYING VOLATILE SUBSTANCES TO MATERIALS

This invention relates to a method and apparatus for the treatment of a material with a volatile substance entrained in a carrier gas. In a particular application of the invention, the method and apparatus is used to treat a food or pharmaceutical product or ingredient with a natural food acid such as carbonic acid for the purpose of achieving at least partial microbial decontamination and/or shelf-life extension.

BACKGROUND OF THE INVENTION

Hitherto, conventional gaseous processes aimed at extending the shelf-life of materials prone to microbial spoilage have relied on modified atmosphere (MAP) procedures. In such procedures, the oxygen gas atmosphere surrounding the material is replaced with a food grade carbon dioxide and/or nitrogen atmosphere, and high barrier colaminate packaging is used to maintain the exclusion of oxygen from the package. The slight acidity produced by the carbonic acid which results from the exposure of the material to carbon dioxide produces a fungicidal effect. However, MAP processes have disadvantages. That is, whilst it has been found that an extension of the shelf-life is achieved in respect of materials treated by the procedures, this extension is limited and considerable costs are involved including the cost associated with the specialised colaminate film packaging used.

In copending U.S. patent application Ser. No. 08/771,400 (the entire disclosure of which is to be regarded as incorporated herein by reference), a method and apparatus is described for extending the shelf-life of materials prone to microbial spoilage by treating the materials with a volatile substance such as a natural food acid. The method described in this copending application involves prior evacuation of the vessel containing the material to be treated and, while this may lead to the more effective treatment of some materials, the inventors have now found that prior evacuation of the vessel containing the material is not necessary for the satisfactory extension of shelf-life.

SUMMARY OF THE INVENTION

Thus, in a first aspect, the present invention provides a method of treating a material, comprising the step of contacting the material with a volatile substance entrained in a carrier gas.

Preferably, the material is a food or pharmaceutical product or ingredient and the method achieves at least partial microbial decontamination and/or shelf-life extension of the food or pharmaceutical product or ingredient.

The volatile substance is preferably microbicidal (e.g. a natural food acid), and is preferably entrained in the carrier gas in saturating amounts. The material may be contacted with the volatile substance/carrier gas mixture provided at pressures greater than ambient.

The method may be performed using a suitable vessel to contain the material during contact with the volatile substance/carrier gas mixture. The method may or may not involve evacuation of the vessel containing the material prior to contacting the material with the volatile substance/carrier gas mixture.

In a second aspect, the present invention provides an apparatus for treating a material comprising:
 a vessel for containing the material;
 means for entraining a volatile substance in a carrier gas; and
 means for contacting the material contained within the vessel with the volatile substance entrained in the carrier gas.

Preferably, the vessel is adapted to allow the volatile substance/carrier gas mixture to be present at pressures greater than ambient. Open vessels may, however, also be used.

DETAILED DESCRIPTION OF THE INVENTION

Figure 1:
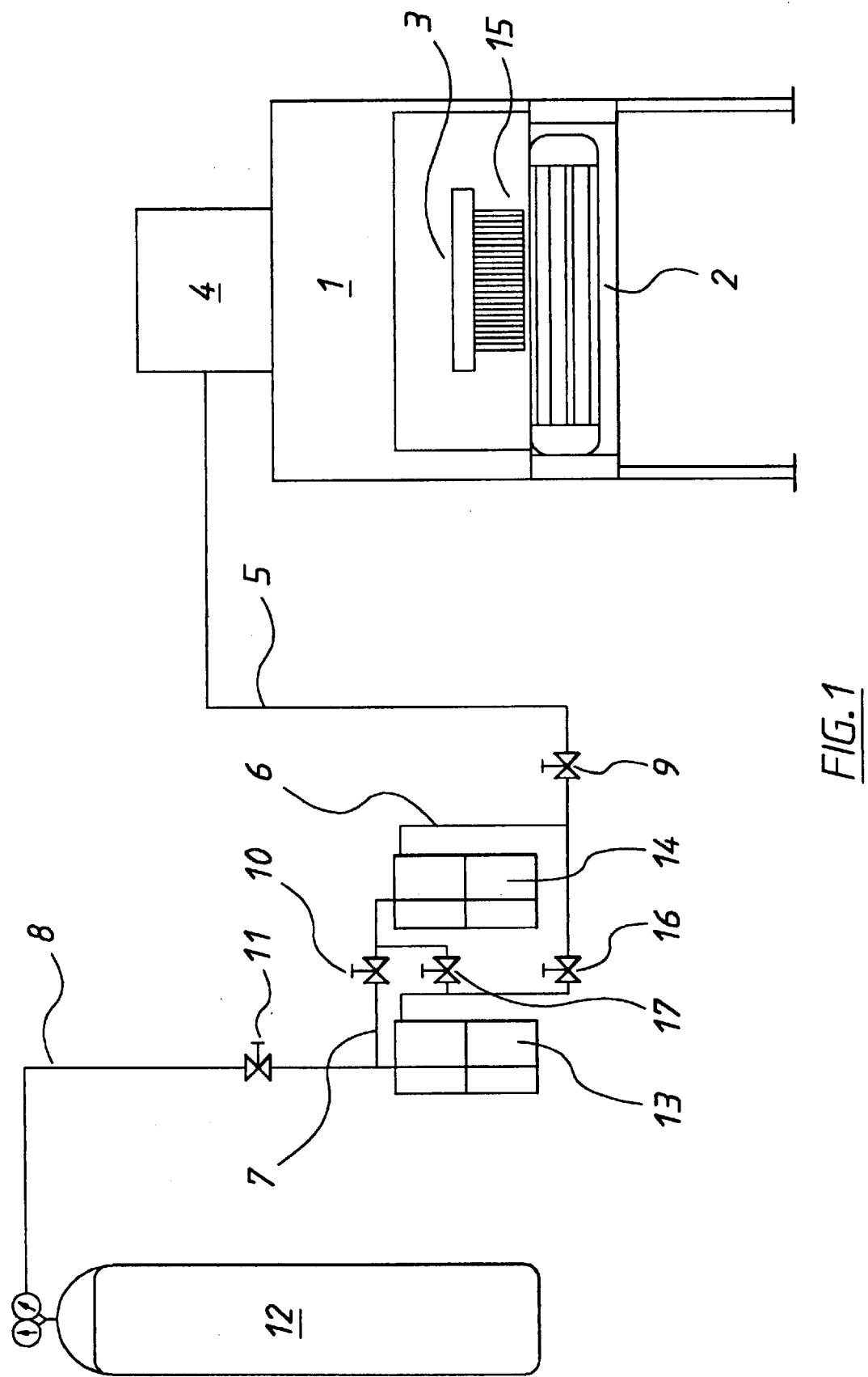
FIG. 1 is a schematic elevational representation of a continuous treatment apparatus according to a first embodiment of the invention.

Materials that can be treated by the method of the invention include any substance for which it is desired to have its chemical and/or physical characteristics altered by means of volatile substances. The method of the invention is suitable for microbial decontamination and/or control of a wide range of food products and ingredients including, but not limited to, baked goods such as bread, whole grain cereals, whole or diced berries, fruits or vegetables, prepared salads, nuts in their shell, nut meats in storage awaiting drying or while undergoing further processing, cheese, smallgoods, cured meats, chicken flesh, carcass on abattoir chains, sea and fresh water foodstuffs, and herbs and spices. The method of the invention is also suitable for microbial decontamination and/or control of pharmaceutical compositions and individual pharmaceutical ingredients, for head space sanitation and control of processing plant equipment. Still further, while the method of the invention may be used in isolation, it is also suitable for use with other treatment processes including for optimising dosing with anti-oxidants where high surface concentrations are desired, for the delivery of soluble food grade or other preservatives, for the depositing of substances onto surfaces with the possible assistance of electrostatic charges or in conjunction with MAP to increase the shelf-life of certain products.

The method of the present invention may be performed batch-wise or continuously in a suitable vessel. Preferably, the vessel is adapted to allow the volatile substance/carrier gas mixture to be present at pressures greater than ambient. For batch treatments, the material may be placed in the vessel using an infeed hopper attached to the vessel through, for example, a suitable valve. Alternatively, wrapped unsealed material may be placed in the vessel manually. For continuous treatments, the material may be placed in and out of the vessel by placing the material on a conveyor and passing the conveyor through the vessel and/or via rotary locks or other similar devices.

The duration of contact between the material and the volatile substance/carrier gas mixture may vary, as necessary, to achieve the desired aim. For example, for microbial decontamination of a material, the duration of exposure is that required to sufficiently reduce the total viable microbial content to a desired value and is dependant on a number of variables including surface area of the material to be treated; flow rates of the carrier gas; water activity (As); type and concentration of volatile substance and the bacterial and fungal bioburden of the material. The efficiency of the treatment method is also dependant on the interaction between the matrix geography and/or chemistry and the added volatile substance.

Typically, the duration of the contact between the material and the volatile substance/carrier gas mixture will be in the order of 0.05 to 2 mins, more preferably, 0.15 to 0.5 mins. However, in some applications of the invention, the duration of the contact between the material and the volatile substance/carrier gas mixture will be up to about 2 hours or more.

Contact between the material and volatile substance/carrier gas mixture may be achieved by means of one or more spargers. To assist contact between the material and volatile substance/carrier gas mixture, the vessel may be provided with means for tumbling and/or passing the material (e.g. through falling under gravity) through the volatile substance/carrier gas mixture.

The method of the present invention may comprise multiple (e.g. up to 3 times) exposure (i.e. contacting) of the material to a volatile substance/carrier gas mixture. The volatile substance(s) used in each exposure may be the same or different. Where multiple exposures are performed using a single vessel, the vessel may be evacuated between exposures and/or flushed with a suitable gas (e.g. the carrier gas).

The volatile substance can be any substance which may be entrained in an inorganic or organic gas and which chemically and/or physically alter the treated material. For example, for microbial decontamination and/or extending the shelf-life of food and pharmaceutical products and ingredients, the volatile substance is preferably a natural food acid, more preferably carbonic acid and/or acetic acid, although any other natural food acid having microbicidal or preserving qualities can be used or other volatile preservative substances. Alternatively, a potentially residue-free chemical biocide such as hydrogen peroxide can be used. Mixtures of such volatile substances may also be used. The ratios of the component volatile substances in such mixtures will typically vary depending on the physical and chemical nature of the material being treated. However, for mixtures such as carbonic acid/acetic acid, carbonic acid/hydrogen peroxide and acetic acid/hydrogen peroxide, the ratio of the component volatile substances may be within the range of 1:10 to 10:1. Moreover, for the mixtures carbonic acid/hydrogen peroxide and acetic acid/hydrogen peroxide, the ratio of the component volatile substances is preferably within the range 1:5 to 5:1, more preferably, about 1:3.

The volatile substance is preferably entrained in the carrier gas by passing the carrier gas through a vessel or vessels containing the volatile substance or by other means by which a sufficient concentration of the volatile substance can be entrained in the carrier gas without the formation of an aerosol. A multiple volatile substance/carrier gas mixture may be provided by mixing a group of parallel preferred volatile substance/carrier gas mixture streams after passing through their respective volatile substance sources or, alternatively, a single carrier gas stream may be passed through a series of volatile substance sources.

Alternatively, the volatile substance can be prepackaged with the carrier gas. The volatile substance is preferably entrained in the carrier gas in saturating amounts.

The carrier gas is preferably carbon dioxide and/or nitrogen gas which can be sourced from a cylinder containing the relevant compressed gas(es). The carrier gas, which is fully or partly stripped of the volatile substance after contact with the material to be treated, may be recycled.

The volatile substance and/or carrier gas may be heated to increase volatility and hence concentration of the volatile substance in the carrier gas. Reduction in carrier gas usage and other efficiencies may result.

In the case of food products and ingredients, the limit to which the material to be treated can be contacted with the volatile substance/carrier gas mixture is generally determined by the flavour resultant from the acidulation of the product. That is, certain volatile substances (e.g. acetic acid), have an unfavourable effect on flavour due to acidulation. However, other volatile substances (e.g. carbonic acid), have been found to cause relatively little organoleptically detectable acidulation and can in some cases actually impart an appealing smoked flavour and/or aroma. In any case, the inventors have noted that the acidic flavour effects resulting from the method of the invention may recede during storage. Further, some materials end use involves heating or cooking (e.g. crumpets), which will also decrease any lingering acidic flavour effects of the method. Mild surface drying to promote volatilisation of surface acids and post-treatment surface addition of alkalis such as approximately 0.2% w/w of sodium bicarbonate may also be used to reduce or avoid acidic flavour effects. It is also preferred that when the material to be treated has critical flavour specifications, the concentration of the volatile substance in the carrier gas be closely monitored and controlled.

Subsequent packing in packaging materials with poor gas barrier properties or small perforations may also assist in the diffusion of volatile substances from the surface of the material(s) treated by the method of the invention thus reducing any acidic flavour effects. Conversely, packaging with excellent gas barrier properties will aid to maintain an atmosphere of volatile substances thus enhancing the preservative effect of the method. Accordingly, the barrier properties of the packaging may be chosen to suit the treated material.

The material to be treated should ideally have a minimum water activity ($A_w$) of approximately 0.85 to allow the volatile substance to quickly transfer across from the carrier gas. An $A_w$ of approximately 0.95 will allow near optimum transference rates and therefore minimum exposure times. To optimise transfer rates it may be appropriate to dose all the gaseous mixture required to an over-pressure of 0.01–0.25 bar (7.5–190mm Hg) and up to 3 bar (2250mm Hg) above atmospheric pressure and allow the appropriate contact time. Lower $A_w$ foodstuffs without the addition of a small quantity of water, generally 1–2% by weight, onto the surface of the material to be treated may require longer exposure times. This additional water can be applied as a fine mist in the case of relatively impervious products such as peppercorns or, preferably, by steaming in more difficult applications.

While particularly suited to use with water soluble volatiles, the method of the invention may also be used with other applications such as those requiring the transfer of volatile substances that are soluble in, for example, lipids or other organic or inorganic solvents other than water (e.g. some anti-oxidants).

Some post-contamination protection is also offered by the method of the invention and thus mechanical and/or human double handling is feasible. It is, however, preferable that where surface acidulation has been decreased to minimise acidic flavour effects, sometimes a requirement with bland materials, the material be handled and packaged in a manner so as to minimise microbial contamination.

The method of the invention may also be performed in combination with one or more treatments of the material in accordance with the method described in copending U.S. patent application Ser. No. 08/771,400. That is, the method of the invention may be performed in combination with one or more supplementary treatments involving evacuation of the vessel containing the material prior to contacting the material with a volatile substance entrained in a carrier gas. Such supplementary treatment(s) may be conducted prior and/or following treatment of the material in accordance with the method of the present invention. The volatile substance used in the supplementary treatment(s) may be the same or different to the volatile substances used in the treatment(s) in accordance with the method of the invention. For some applications, the method of the invention may be performed in cycles with such supplementary treatments. Additionally, the volatile substance used in the separate cycles may vary or remain the same. The supplementary treatment(s) may be performed in the same vessel to that in which the material is treated in accordance with the method of the invention, or the supplementary treatment(s) in a separate vessel(s). In either case, the means for evacuating the vessel(s) is preferably provided by an external vacuum source. The evacuation is preferably conducted rapidly to achieve a sub-ambient pressure.

In addition, the inventors have found that it can be advantageous to dip or spray the material in/with a solution of the volatile substance, preferably prior to contacting the material with the volatile substance/carrier gas mixture. Dipping may be readily achieved by, for example, passing a conveyor with the material through a tank of an aqueous solution of the volatile substance. Following dipping, the material may then be conveyed to a suitable vessel for treatment with a volatile substance/carrier gas mixture in accordance with the method of the invention.

The invention will hereinafter be further described by way of reference to the following, non-limiting examples and accompanying figures.

As shown in FIG. 1, continuous treatment of materials in accordance with the method of the invention may be achieved through a dedicated treatment system or commercially available packaging machine 1, equipped with a conveyor 2, a gas sparging head 3 and a gas control system 4. Connected to the gas sparging head 3 by means of lines 5, 6, 7 and 8 and valves 9, 10 and 11 is a compressed gas source 12, one or more volatile substance sources 13, preferably sparging vessels, and an aerosol trap 14. The aerosol trap 14 is intended to minimise large droplets of the volatile(s) which can cause undesirable spotting and non-uniform distribution of the volative(s) on the material surface. Multiple volatile substance sources 13 may be used to assist complete saturation of the carrier gas.

In the case of treatment with carbonic acid, the volatile substance source 13 may be at least initially filled with purified water such that bubbling of the $CO_2$ gas therethrough produces carbonic acid thus causing the $CO_2$ carrier gas to be at least partially saturated with the produced carbonic acid. Some materials will benefit more after the carrier gas, preferably food grade carbon dioxide, has been passed through multiple volatile substance sources solvents to achieve a mixture of volatiles in the carrier gas. Various type, combinations and concentrations of saturated carrier gases may be used to treat the material to optimise shelf-life and flavour parameters, particularly various mixtures of acetic and carbonic acids and hydrogen peroxide. A multiple volatile substance/carrier gas mixture may be provided by mixing a group of parallel preferred volatile substance/carrier gas mixture streams after passing through their respective volatile substance sources or, alternatively, a single carrier gas stream may be passed through a series of volatile substance sources.

In use, a batch of material 15 to be treated is introduced to a commercially available packaging machine 1. The carrier gas is forwarded from the compressed gas source 12 to the volatile substance source 13, the volatile substance thereby becoming entrained in the carrier gas, which is then introduced into the packaging machine 1 through gas sparging head 3 to thereby contact the material 15. Valves 16 and 17 may be operated to bypass the additional volatile substance source 13 if only one volatile substance source is required. The carrier gas, which is at least partially stripped of the volatile substances, is allowed to escape through a pressure regulator valve achieving a desired process overpressure for the desired contact time.

The duration of contact between the material and the volatile substance/carrier gas mixture may be optimised to provide the maximum reduction in microbial bioburden while achieving the desired flavour and other properties of the material being treated. Once the desired duration of contact is attained, the flow of carrier gas is ceased and the pressure regulating valve released. The treated material is then removed from the vessel and packaged.

Figure 2:
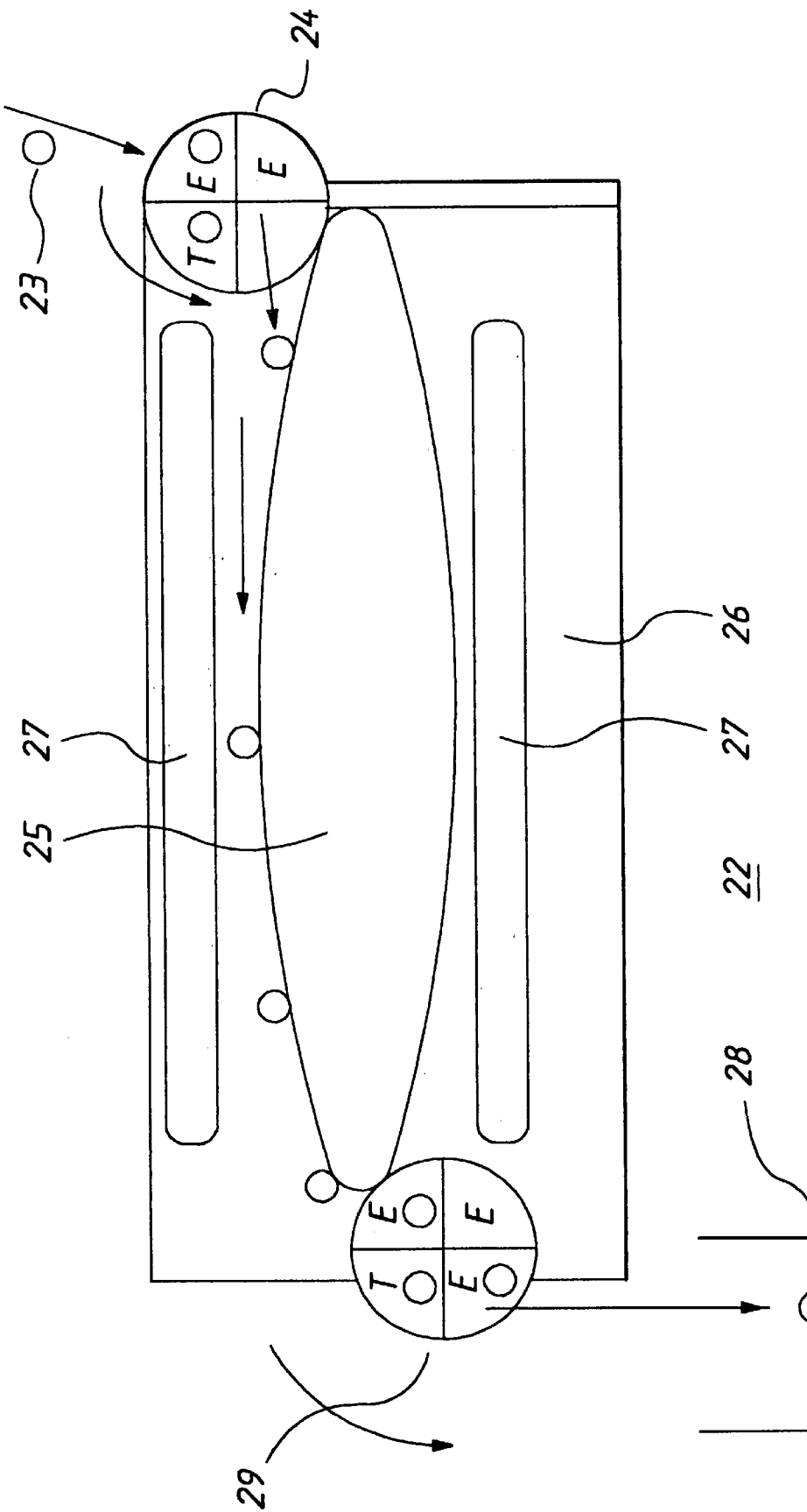
FIG. 2 is a schematic elevational representation of a continuous treatment apparatus according to a second embodiment of the invention.

As shown in FIG. 2, an alternative continuous treatment of materials in accordance with the method of the invention is achieved through a dedicated treatment system 22, wherein material 23 is fed to a first rotary vacuum lock 24 (or other effective cavity mechanism) then, in turn, to conveyor 25 within treatment vessel 26 where the material is contacted with a volatile substance/carrier gas mixture, provided through gas sparging heads 27, without prior evacuation of the treatment vessel 26 in accordance with the method of the invention. From the conveyor, the treatment material is transferred to a collecting hopper 28 via a second rotary vacuum lock 29 (or other effective cavity mechanism). The first and second rotary vacuum locks 24 and 29 isolate the treatment vessel 26, and permit operation of a two or three stage process wherein the material is also treated within the first and/or second rotary vacuum locks 24 and 29 with supplemental treatment(s) involving contacting the material with a volatile substance/carrier gas mixture preferably following evacuation as denoted by "T" for treatment and "E" for evacuation in FIG. 2. The stage performed in the treatment vessel 26 may be of considerably longer duration than either or both of the supplementary treatment(s) and may benefit from cost efficiencies associated with carrier gas recycling. Each of the stages could use the same or different volatile substances.

Figure 3:
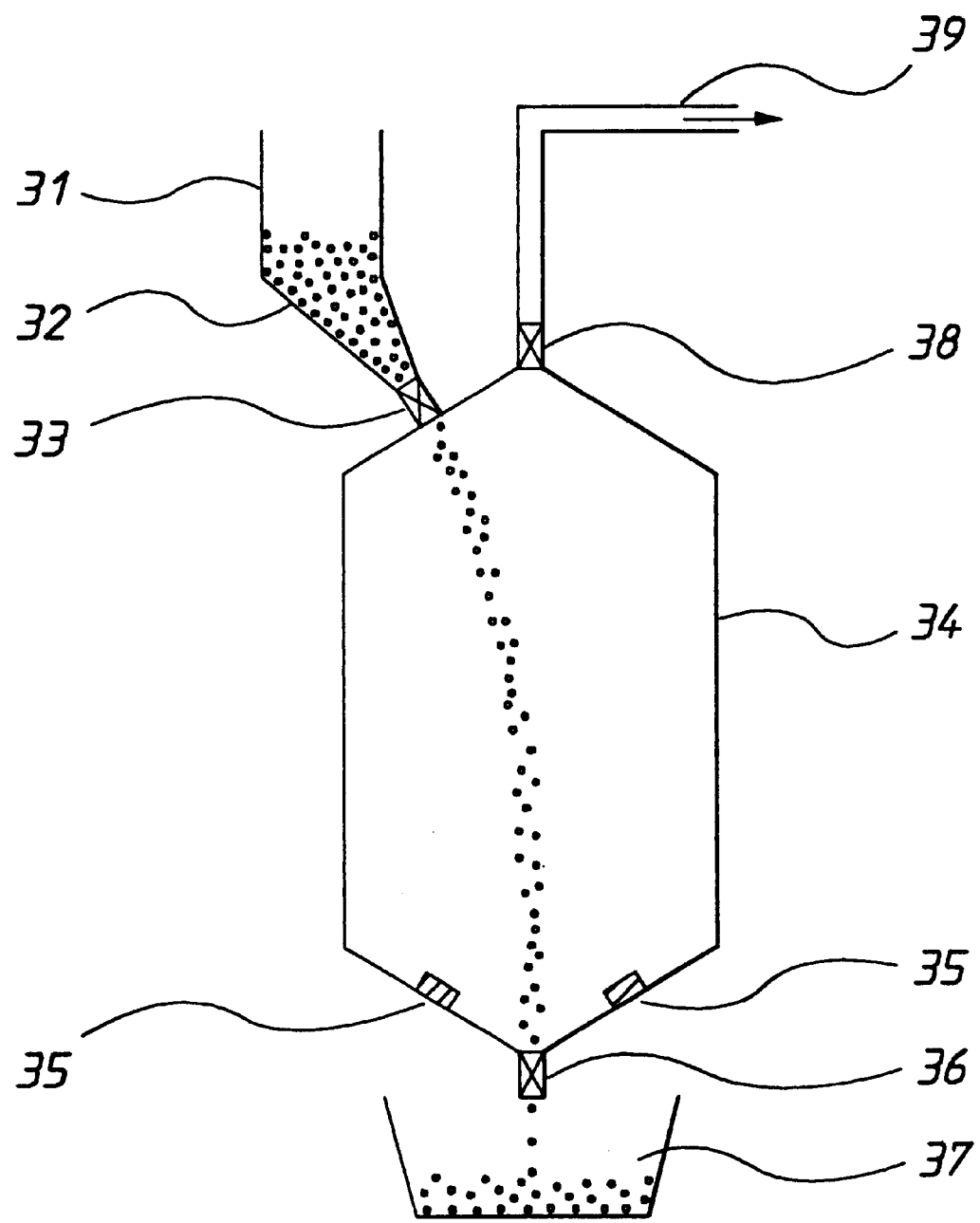
FIG. 3 is a schematic elevational representation of a continuous treatment apparatus according to a third embodiment of the invention.

As shown in FIG. 3, continuous treatment of materials in accordance with the method of the invention may also be achieved through a dedicated treatment system, equipped with a means 31 such as an infeed hopper to deliver material 32 through a suitable valve 33 (or conveyor) to the top of a vertical vessel 34 provided with one or more gas sparging heads 35 and material outlet valve 36 (or conveyor) located within the base. A collecting hopper 37 is provided adjacent material outlet valve 36. The gas sparging head(s) 35 may be connected to a gas control system and sources of compressed carrier gas and one or more volatile substances in a manner as described above in connection with FIG. 1. The material 32 passes through the vessel to the material outlet valve 36, preferably in counter-current flow to the volatile substance entrained in the carrier gas. The carrier gas may be removed from the top of the vessel 34 through pressure regulator valve 38 and flue 39 and recycled if desired. Residence time of the material within the vessel may be varied by adjusting flow rate of the material 32 and/or volatile substance/carrier gas mixture and/or by adjusting vessel 34 height so as to achieve a desired duration of contact between the material and volatile substance/carrier gas mixture or, alternatively, by interposing a screw conveyor system within the vessel with variable rotating speed to control the passage of the material 32 as it passes through the vessel 34. In this configuration, the vessel 34 need not be erected vertically but can be arranged in any position compatible with the angle of repose dictated by the material 32 being treated.

Continuous treatment as shown in FIG. 3 may be particularly suitable for grated/shredded cheese, other particulates and leafy materials such as herbs.

Example 1
Treatment of Shredded Cheese

In this example, shredded cheese was placed in an evacuable test vessel and exposed to a acetic acid/$CO_2$ gas mixture for the designated period(s) (i.e. 2×10 seconds—with prior evacuation; 1×15 seconds—without prior evacuation) with or without prior evacuation of the vessel. The shredded Control and treated samples were stored under identical conditions at approximately 5° C. After three hours the control developed a dark orange colour and synerisis at three days. After three weeks there was very little change in the treated sample. Furthermore, only a slight amount of synerisis was observed after an additional 24 hour storage time (i.e. total 3 weeks and 1 day) at ambient temperatures. No change in colour nor observable mould growth was seen.

In similar trials with avocado, shelf-life was extended from three hours to sixty six hours; the assessment parameters again being colour and observable mould growth.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

TABLE 1

| FOODSTUFF | GAS MIX | No. of FLUSH | FLOW RATE | EXP. SEC. | Total. Plate Count | % Reduction | Yeast & Mould Count | % Reduction |
|---|---|---|---|---|---|---|---|---|
| SHREDDED CHEESE CONTROL | CONTROL | CONTROL | CONTROL | CONTROL | 3.61E+05 | CONTROL | 5.87E+05 | CONTROL |
| | | | | | 4.56E+05 | CONTROL | 7.80E+05 | CONTROL |
| | | | | | 2.19E+05 | CONTROL | 8.16E+05 | CONTROL |
| | | | | Mean | 3.45E+05 | CONTROL | 7.28E+05 | CONTROL |
| SHREDDED CHEESE VACUUM/FLUSH Sample Wt: 10 gms Aw | ACETIC 0.86 | 2 | 22 L/M | 10 | <10 | >99.999 | 8.00E+00 | 99.9989 |
| SHREDDED CHEESE NO VACUUM Sample Wt: 10 gms Aw | ACETIC 0.86 | 1 | 22 L/M | 15 | <10 | >99.999 | <10 | >99.999 | cheese was contained in plastic bags and a degree of pressure was allowed to develop in the plastic bags during treatment. The majority of the gas mixture entering the vessel escaped with approximately 50% of the residual gas mixture being expelled manually prior to sealing of the plastic bags. The samples were then stored for approximately twenty four hours prior to microbiological analysis. The results are provided in Table 1.

As can be seen from Table 1, a substantial reduction in the microbial bioburden of the shredded cheese was achieved both with and without the assistance of evacuation prior to contact with the acetic acid/$CO_2$ gas mixture.

Example 2
Treatment of Fruit with Carbonic Acid Dipping

In this example, a twenty gram piece of skinned mango was dipped into an equilibrated aqueous solution of carbonic acid for ninety seconds while a continual supply of food grade carbon dioxide was bubbled through the solution in an attempt to maintain an excess concentration of carbonic acid. The mango piece was treated with volatile carbonic acid in $CO_2$ carrier gas and held in this gaseous atmosphere at approximately 5° C. for ten minutes whilst the aqueous carbonic acid dipping solution equilibrated (pH 4.0 by paper). Following re-dipping of the mango piece for one hundred and eighty seconds, excess water was removed by shaking.

We claim:

1. A method for reducing the viable microbial content of a solid material for human consumption, which is susceptible to microbial spoilage, said method comprising
    contacting exposed surfaces of the material with a gas mixture comprising a major portion of a carrier gas and a minor portion of a volatile substance selected from the group consisting of natural food acids, chemical biocides and mixtures thereof for a period of 2 minutes or less during which time the volatile substance partitions into solution upon said exposed surfaces;
    wherein said method does not involve a prior step of subjecting the material to a vacuum, and further wherein, at the time of contacting the exposed surfaces of the material with said gas mixture, the exposed surfaces of the material have a water activity ($A_w$) of greater than or equal to 0.85.

2. A method according to claim 1, wherein the volatile substance includes carbonic acid.

3. A method according to claim 1, wherein the volatile substance includes acetic acid.

4. A method according to claim 1, wherein the volatile substance includes hydrogen peroxide.

5. A method according to claim 1, wherein the volatile substance is selected from the group consisting of carbonic acid, acetic acid, hydrogen peroxide and mixtures thereof.

6. A method according to claim 1, wherein the volatile substance is entrained in the carrier gas by passing the carrier gas through a vessel containing the volatile substance.

7. A method according to claim 1, wherein the volatile substance is prepackaged with the carrier gas.

8. A method according to 1, wherein the volatile substance is entrained in the carrier gas in saturating amounts.

9. A method according to claim 1, wherein the carrier gas is selected from the group consisting of carbon dioxide, nitrogen and mixtures therof.

10. A method according to claim 1, wherein the method is conducted either batch-wise or continuously.

11. A method according to claim 1, wherein the duration of contacting the material with the volatile substance entrained in a carrier gas is in the range of 0.15 to 0.5 minutes.

12. A method according to claim 1 further comprising a step of applying an aqueous solution of a volatile substance to a surface of the material prior to the step of contacting the material with the volatile substance entrained in a carrier gas.

13. A method according to claim 12, wherein the step of applying the aequeous solution of a volatile substance to a surface of the material is by dipping or spraying.

14. A method according to claim 1, wherein contacting the material with a volatile substance entrained in a carrier gas is conducted in a vessel with an overpressure of up to 3 bar (2250 mm Hg) above atmospheric pressure.

15. A method according to claim 1, wherein contacting the material with the volatile substance entrained in a carrier gas is repeated up to 3 times.

16. A method according to claim 15, wherein each step of contacting the material with the volatile substance entrained in a carrier gas is conducted in separate vessels.

17. A method according to claim 15, wherein each step of contacting the material with the volatile substance entrained in a carrier gas is conducted in a single vessel.

18. A method according to claim 17, wherein between each step of contacting the material with the volatile substance in a carrier gas, the vessel is flushed with a suitable gas.

19. A method according to claim 1, wherein the material to be treated is a food, pharmaceutical product or ingredient thereof.

20. An apparatus for material reducing the viable microbial content of a solid material for human consumption which is susceptible to microbial spoilage, said apparatus comprising:

a vessel for containing the material;

a means for entraining a volatile substance in a carrier gas to form a gas mixture comprising a major portion of a carrier gas and a minor portion of a volatile substance selected from the group consisting of natural food acids, chemical biocides and mixtures thereof;

means for adjusting the water activity ($A_w$) of exposed surfaces of the material to greater than or equal to 0.85; and means for contacting the material contained in the vessel with the gas mixture for a period of 2 minutes or less, during which time the volatile substance partitions into solution upon said exposed surfaces; and wherein the apparatus does not include a means for evacuating the vessel.

21. An apparatus according to claim 20, wherein the means for entraining the volatile substance in the carrier gas is a compressed gas source in communication with a volatile substance source.

22. An apparatus according to claim 20, wherein the means for contacting the material contained within the vessel with the volatile substance entrained in the carrier gas comprises a sparger.

23. An apparatus according to claim 20 further comprising a means for tumbling the material within the vessel.

24. An apparatus according to claim 20, wherein the apparatus is arranged such that the material passes through the vessel in counter-current flow to a flow of the volatile substance entrained in the carrier gas.

25. An apparatus according to claim 20, further comprising a conveyor for continously conveying the material into the vessel.

26. An apparatus according to claim 20, further comprising means for feeding the volatile substance entrained in the carrier gas to the vessel to achieve an over-pressure of up to 3 bar (2250 mm Hg) above atmospheric pressure.

27. An apparatus according to claim 20, further comprising means for contacting the material with an aqueous solution of a volatile substance.

28. An apparatus according to claim 27 wherein the aqueous solution is a solution of the same volatile substance entrained in the carrier gas.

29. A method according to claim 1, wherein at the time of contacting the exposed surfaces of the material with said gas mixture, the exposed surfaces of the material have a water activity ($A_w$) of greater than or equal to 0.95.

* * * * *